United States Patent [19]

Peck

[11] Patent Number: 5,273,434

[45] Date of Patent: Dec. 28, 1993

[54] SYSTEM FOR TRAINING TECHNICIANS FOR SERVICING ELECTRONIC PRINTERS AND PRINTING SYSTEMS

[75] Inventor: Lawrence E. Peck, Macedon, N.Y.

[73] Assignee: Xerox Corporation, Stamford, Conn.

[21] Appl. No.: 748,717

[22] Filed: Aug. 22, 1991

[51] Int. Cl.⁵ .............................................. G09B 19/00
[52] U.S. Cl. .............................................. 434/224
[58] Field of Search ................ 434/219, 224, 379; 355/200, 201, 203–209

[56] References Cited

U.S. PATENT DOCUMENTS

| | | | |
|---|---|---|---|
| 4,206,995 | 6/1980 | Legg | 355/204 |
| 4,316,720 | 2/1982 | Ackerman | 434/224 |
| 4,609,919 | 9/1986 | Miyazaki et al. | 355/206 |
| 4,776,798 | 10/1988 | Crawford | 434/224 |
| 4,943,238 | 7/1990 | Gregorio | 434/219 |
| 5,049,931 | 9/1991 | Knodt | 355/209 |

*Primary Examiner*—Richard J. Apley
*Assistant Examiner*—Glenn E. Richman
*Attorney, Agent, or Firm*—Frederick E. McMullen

[57] ABSTRACT

A system for on-site training of technicians to service copying and printing machines in which certain training exercises are stored in the memory of each machine, with access and selection of a training exercise enabled through the machine programming control during diagnostics, selection and installation of a training exercise overwriting normal programming selections until the training exercise is completed.

7 Claims, 11 Drawing Sheets

The Training Mode has been enabled.  Information

Active Codes

Queued Faults    Range Faults    Message Codes

— 230    — 232

Machine Information

* Last Call History
  Date:
  Status:
  Cause:
  Comments:

* Previous Call History
  Date:
  Status:
  Cause:

* Account Statistics
  Serial Number:
  Software Release:
  Service Option:
  Total Prints:
  Prints Since Last Call:
  Prints Since Last 2 Calls:
  Prints Since Last 3 Calls:
  Total Scans:
  Scans Since Last Call:
  Scans Since Last 2 Calls:
  Scans Since Last 3 Calls:

Update the Displays — 250

Cancel
| 0 |
| 1 | 2 | 3 |
| 4 | 5 | 6 |
| 7 | 8 | 9 |
| Enter | 0 | C |

— 240

52-2

Printer Fault History
Paper Handling Jams   0%
Finishing Jams        0%
Xerographic Faults    0%
Run Control Faults    0%
All Other Faults      0%

Scanner Fault History
DH Jams               0%
Run Control Faults    0%
All Other Faults      0%

Controller Fault History
Controller Rollovers  0%
RIC Faults            0%

Call Closeout

SYSTEM FOR TRAINING TECHNICIANS FOR SERVICING ELECTRONIC PRINTERS AND PRINTING SYSTEMS

The invention relates to electronic printers and printing systems, and more particularly, to a system for enhancing training of servicing technicians for such printers and printing systems.

Current day copiers and electronic printers are relatively complex machines, with the level of complexity normally increasing with increases in machine size, speed, and feature selections. Concurrent with this, the servicing needs of the machine and the diagnosing and correcting of faults and malfunctions increases and becomes more difficult with increased machine complexity. Effective service, diagnoses, and repair of machines of this type requires competent and well trained service personnel or technicians, and this obviously becomes more critical and important as the complexity of the machine increases.

Essential to the creation of well trained technicians and service personnel is the need to educate and teach the technician not only to diagnose, repair, and adjust the machine, but also to make maximum use of any diagnostic and servicing aides built into the machine. For training, it is usual practice wherever possible to train the technician on the same machine or machines that he will be charged with servicing. While in-house training programs can at least in theory provide this, the realistic and practical service information such as fault histories, fault threshold values, high frequency service item data, etc. can really only come from machines in the field.

For that reason, it is desirable to provide standardized examples of representative field problems complete with fault histories for analysis by the trainee technician. To obtain maximum effectiveness, it is desirable that these training examples and situations be provided on an actual machine. However, this normally requires that a machine be reserved and programmed exclusively for this purpose. Or if this is not possible, that a machine be provided with the ability to load simulated data, etc.

In the prior art, U.S. Pat. No. 4,316,720 to Ackerman discloses a maintenance training system that permits a student to receive hands-on maintenance training of an electronic system without interfering with the operation of the electronic system. This is effected by allowing the students to locate defective simulated components that may be used to operate the electronic system, the simulated components and the actual electronic system being controlled by a computer. In response to an instruction entered into the computer by an instructor, a particular simulated electronic component is made to appear defective and the system cause to behave in a manner corresponding to the simulated defect.

In contrast, the present invention provides a process for enhancing training of technicians for servicing copiers and electronic printers of the type having a user interface with interactive display screen for displaying program selections and operating information and data for use in programming and operating the machine, and an operating system for operating the machine in response to the programming instructions that are input including machine service instructions for servicing the machine, the machine service instructions including a service dialog for displaying servicing instructions and machine data, comprising the steps of: embedding a plurality of training programs permanently in the operating system for use in training the technicians; for training, selecting a preset one of the training programs; interrupting access between the operating system and the machine service dialog; overwriting any programming selections displayed on the user interface with program selections generated by the selected training program; operating the machine in accordance with the selected training program to simulate predetermined machine operating conditions and faults; and on completion of the training program, restoring normal operation of the machine.

Figure 1:
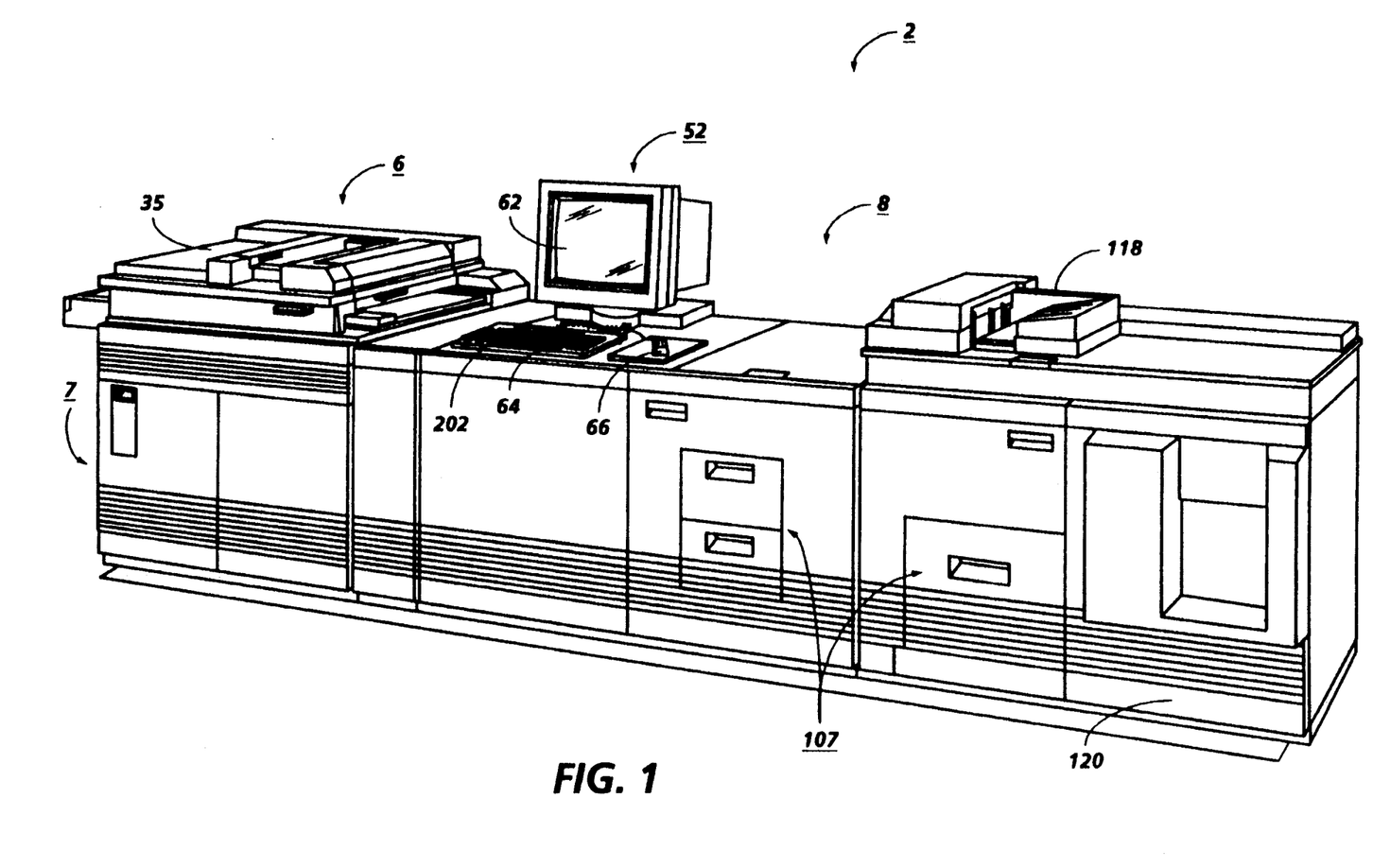
FIG. 1 is a view depicting an electronic printing system incorporating the training system of the present invention.
Figure 2:
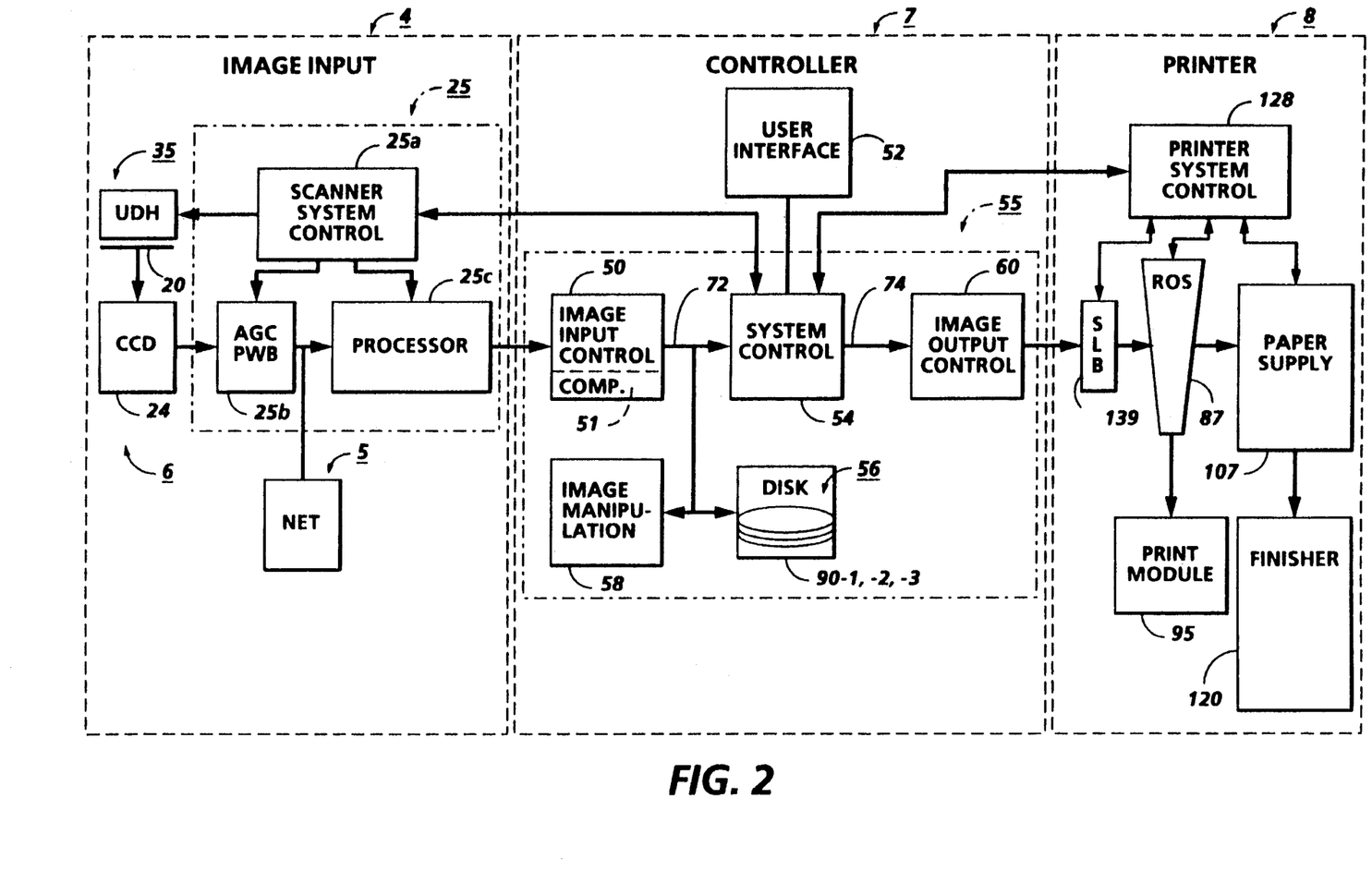
FIG. 2 is a block diagram depicting the major elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controlled section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving,recording systems, etc. as well.

For off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by Paper Supply 107. The print media may comprise any of a variety of sheet sizes, types, and colors, and for this, plural media supply trays 1, 2, 3, (seen in FIG. 1) are provided. The transferred image is permanently fixed or fused and the resulting prints discharged to either output tray 118 (seen in FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system controller 128 automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input controller 50, User Interface (UI) 52, system controller 54, main memory 56, image manipulation section 58, and image output controller 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input controller 50 and placed in an image file. Image files, which represent different print jobs, are temporarily stored in system memory 61 (seen in FIG. 3A) pending transfer to main memory 56 where the data is held pending use.

As seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point cursor 67 (seen in FIG. 4) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output controller 60.

Figure 3A:
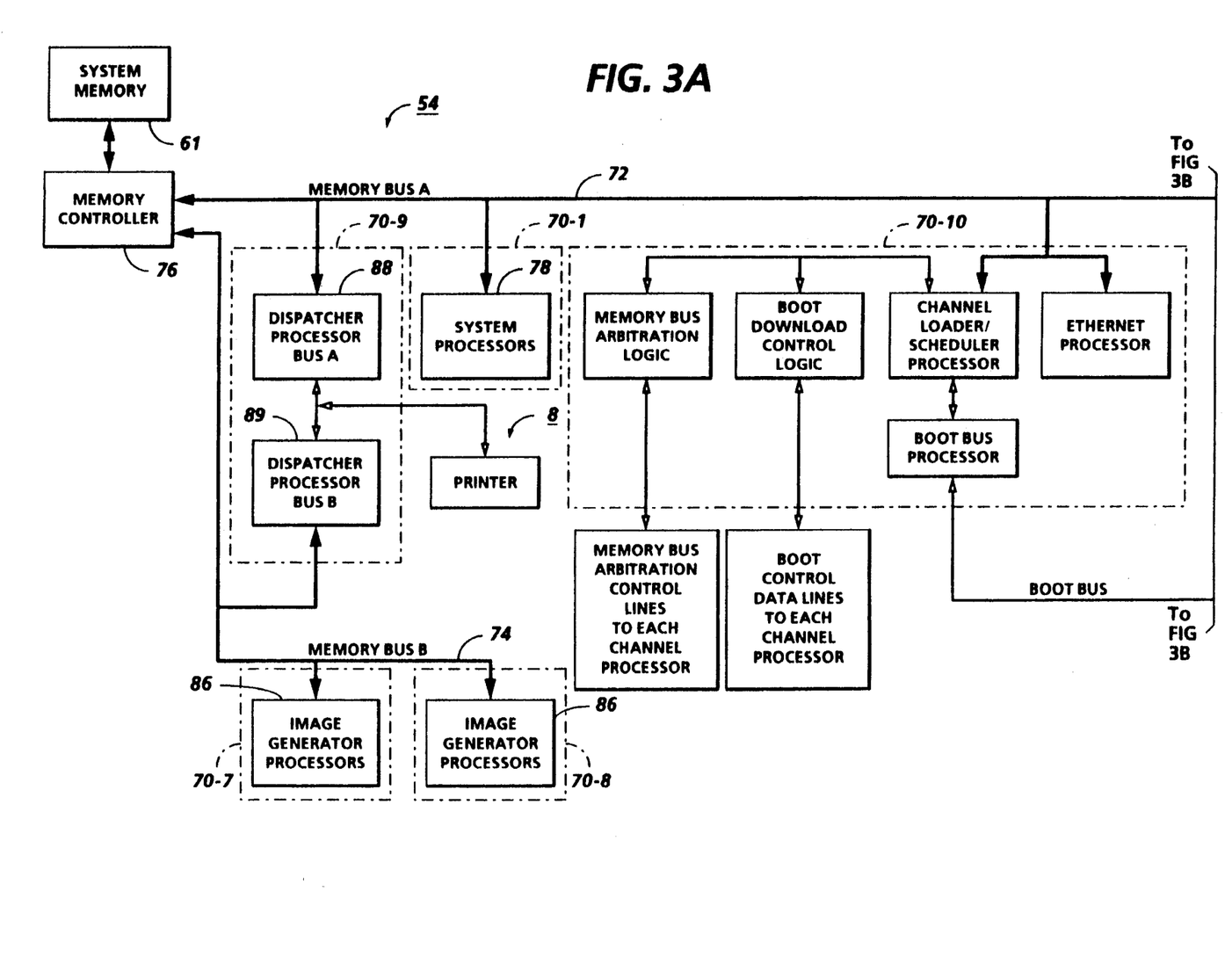
FIGS. 3A, 3B, and 3C comprise a schematic block diagram showing the major parts of the control section for the printing system shown in FIG. 1.
Figure 3B:
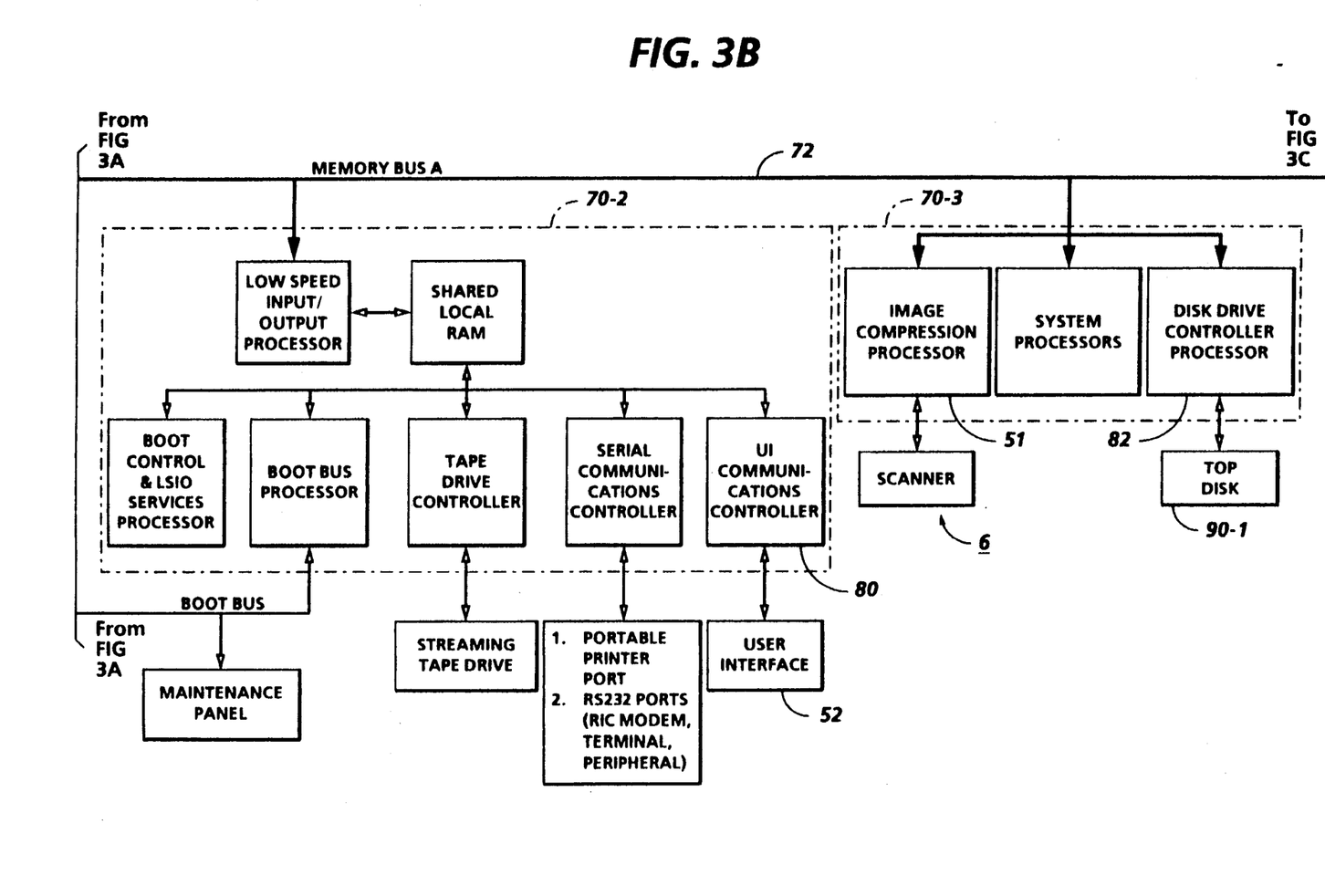
Figure 3C:
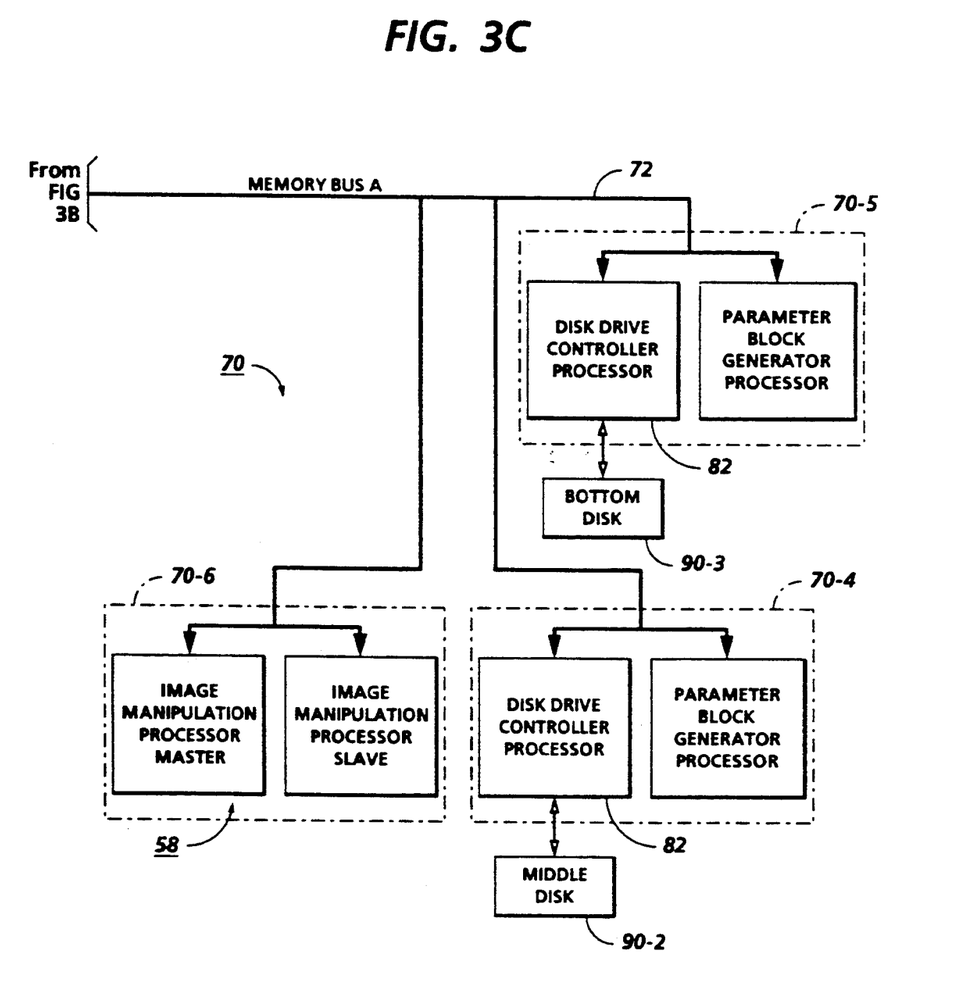

Referring particularly to FIGS. 3A-3C, image data output to image output controller 60 is decompressed and readied for printing by image generating processors 86 of PWBs 70-7, 70-8. Following this, the data is output by dispatch processors 88, 89 on PWB 70-9 via Scan Line Buffer (SLB) 139 to printer section 8. Image data sent to printer section 8 for printing is normally purged from memory 56 to make room for new image data.

Control section 7 includes a plurality of Printed Wiring Boards (PWBs) 70, PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 4:
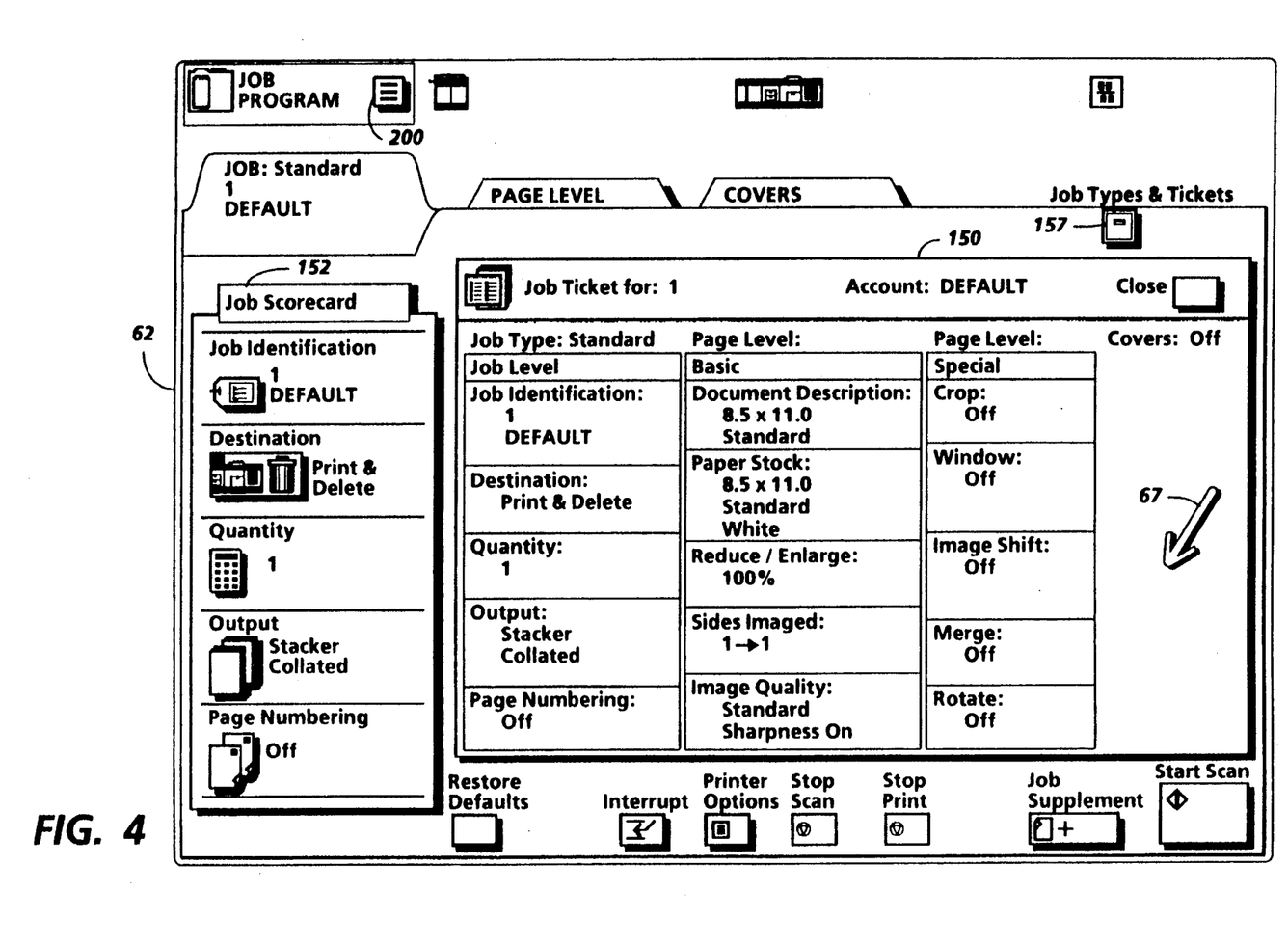
FIG. 4 is a view depicting an exemplary job programming ticket and job scorecard displayed on the User Interface (UI) touchscreen of the printing system shown in FIG. 1.
Figure 5:
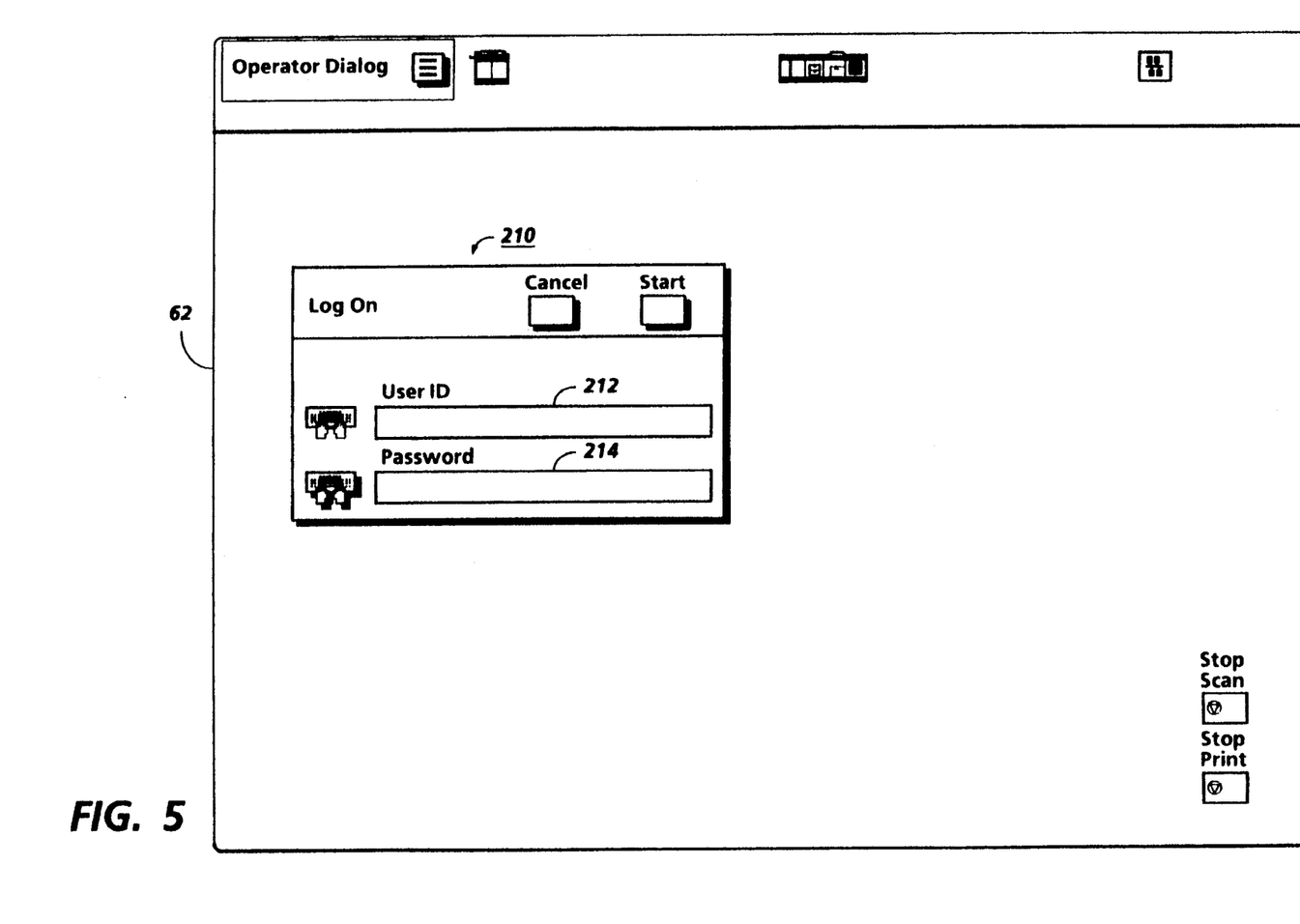
FIG. 5 is a view of the UI touchscreen in which the Log-On Sheet for entry into Diagnostics mode is shown.
Figure 6:
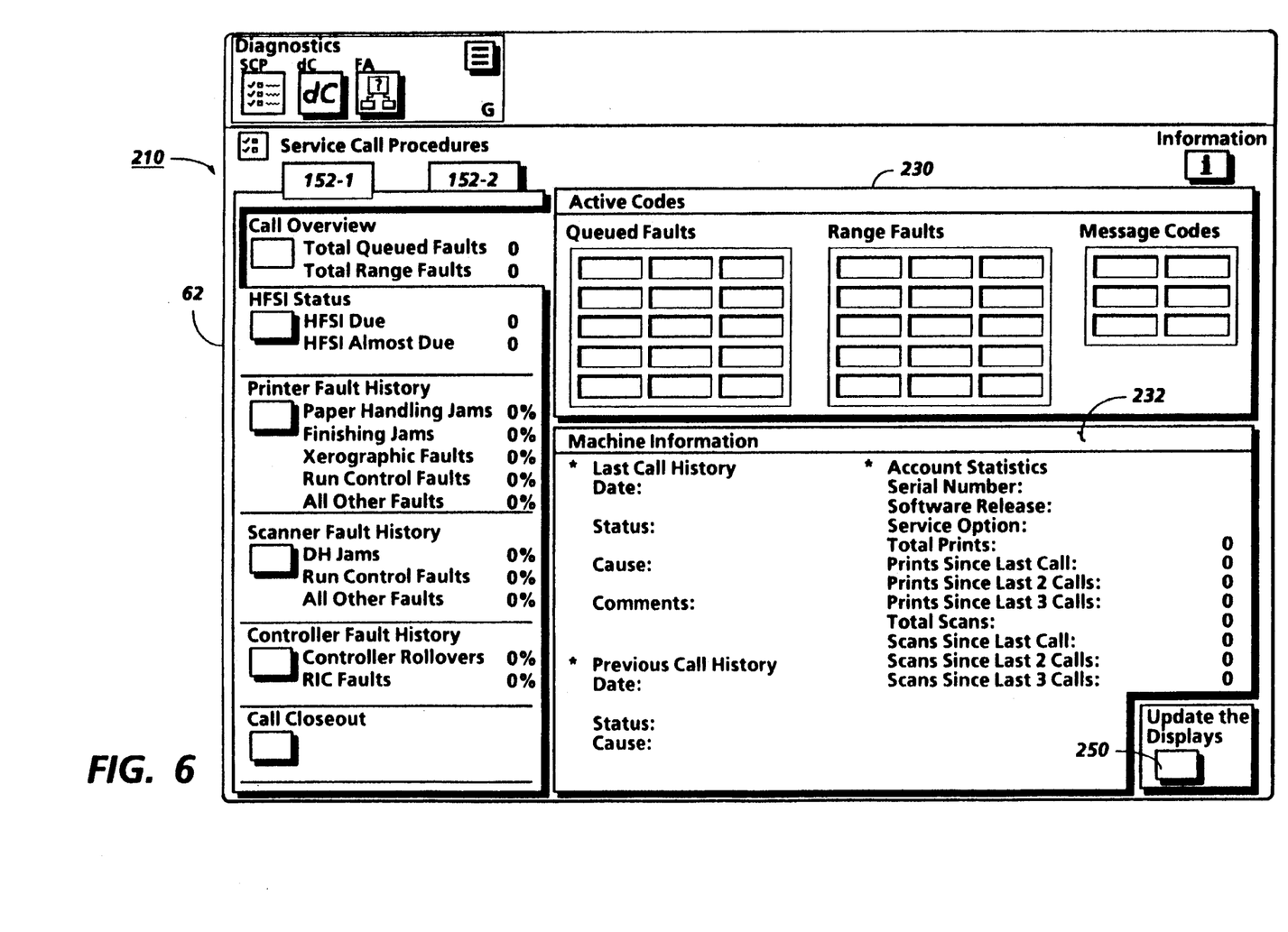
FIG. 6 is a view of the UI touchscreen with the Service Call Procedure sheet in Diagnostic mode displayed following selection of the Call Overview procedure showing "Active Codes" and "Machine Information" windows.

Referring to FIG. 4, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5; jobs remotely developed and then submitted to the system for printing, etc.

Referring now to FIGS. 4-7 and 9, a service dialog provides access to various diagnostic routines available to the service representative (referred to herein as Tech Rep) for use in identifying and correcting faults. Alternately or in addition, diagnostic routines may be loaded in from exterior sources as by floppy disk, streaming tape, etc. To access the service dialog, a system auxiliary menu icon 200 is provided together with a "Diagnostic" selection button 202 on keyboard 64 (seen in FIG. 1). On actuation of auxiliary menu icon 200, a Log On sheet 210 is displayed on screen 62 with "User ID" and "Password" windows 212, 214 to enable the Tech Rep to log on to the system. When logged on, "Diagnostic" button 202 on keyboard 64 is depressed to display on screen 62 "Service Call Procedures" (SCP) frame 226. Frame 226 has scorecards 152-1 and 152-2 together with a window 230 for "Active Codes" such as Queued Faults, Range Faults, and Message Codes, and a window 232 for "Machine Information" in which various machine statistics and data such as Total Prints, Software Release, etc. are displayed.

Figure 7:
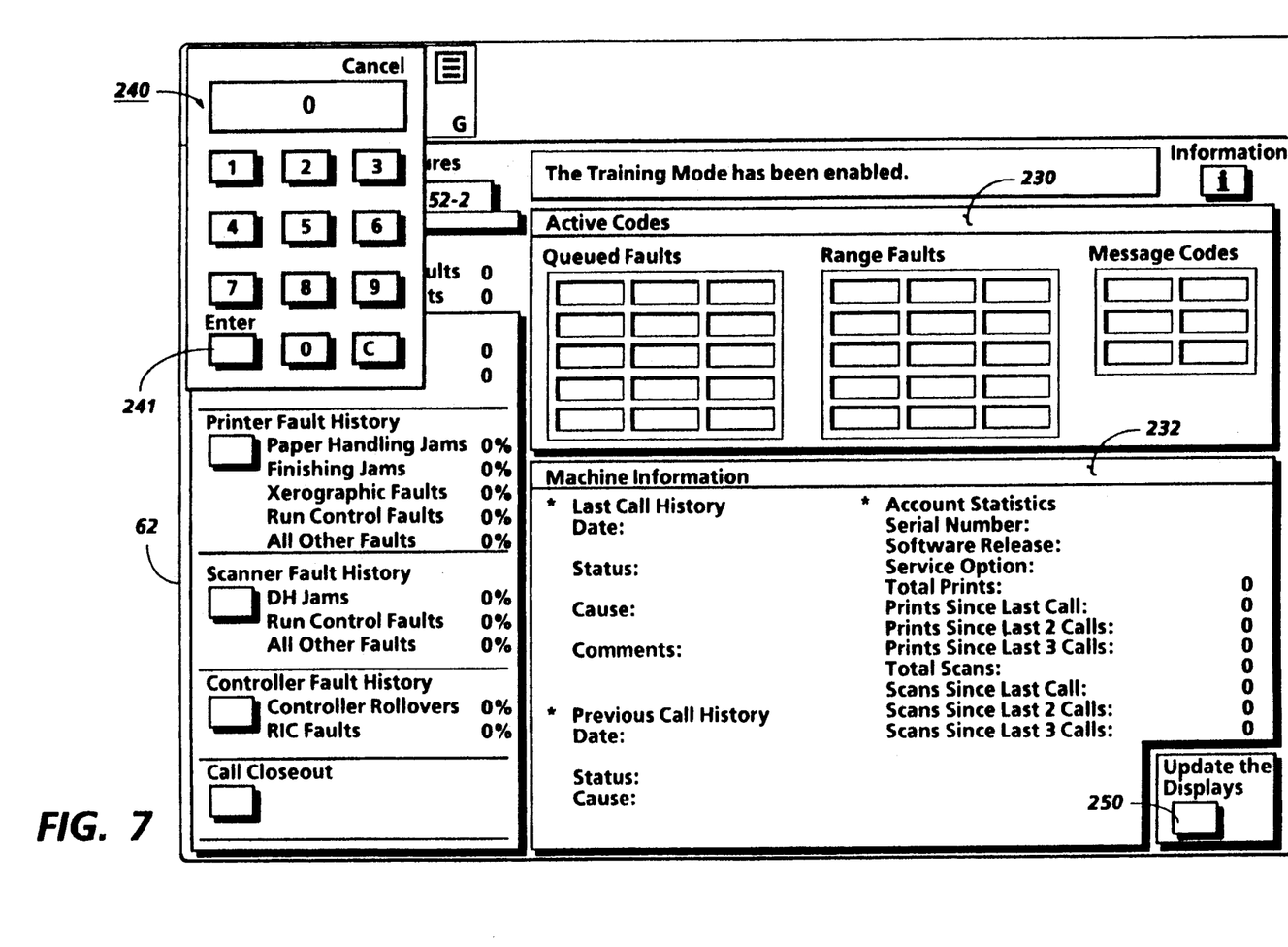
FIG. 7 is a view of the UI touchscreen with the keyboard for selecting training exercise displayed.

The trainer next displays a secret keyboard 240 on screen 62 by touching a special area on the screen. Using keyboard 240, the trainer types in a special training password and actuates the "Enter" button 241 of keyboard 240. With entry of the correct password, access of the operating system to the service dialog is interrupted and the training mode is enabled allowing various training exercises to be run on the machine. At the same time, informational updates, which normally overwrite any data displays including information from a training exercises, are disabled. Thus, during operation of system 10 in the training mode, events normally displayed through updates such as "Queued Faults", "Range Fault", "Message Codes", etc. are not displayed but instead held in memory until such time as the training mode is exited. At that point, the Active Codes and Machine Information windows 230, 232 are updated with any fresh machine data accumulated during the training exercise.

Once the training mode is established, the trainer, using keyboard 240, enters the ID number for the diagnostic training exercise that is to be run. On entry into the program, all screen displayers are refreshed with new data from the particular training exercise selected.

Figure 8:
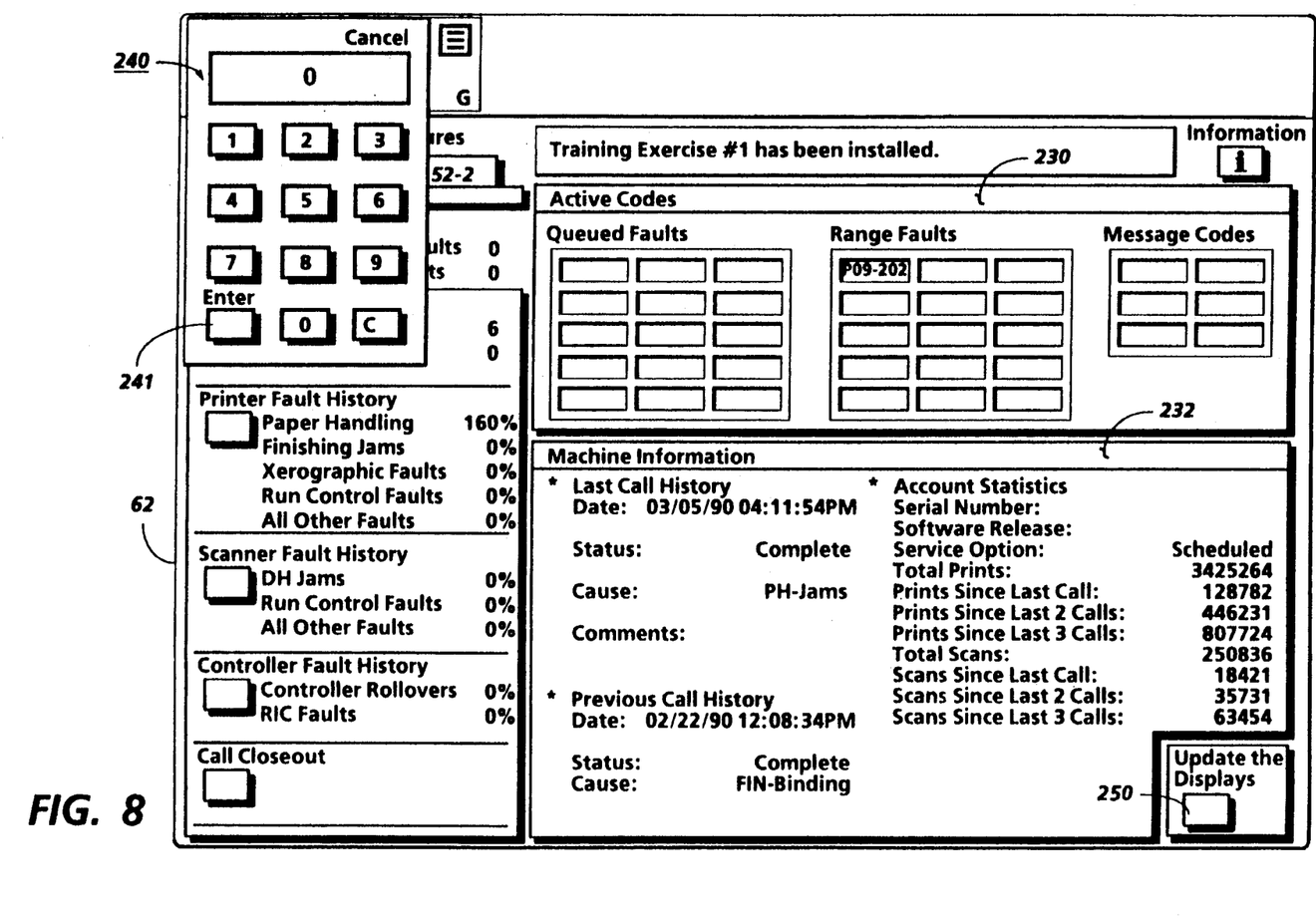
FIG. 8 is a view of the UI touchscreen following selection and installation of a training exercise.
Figure 9:
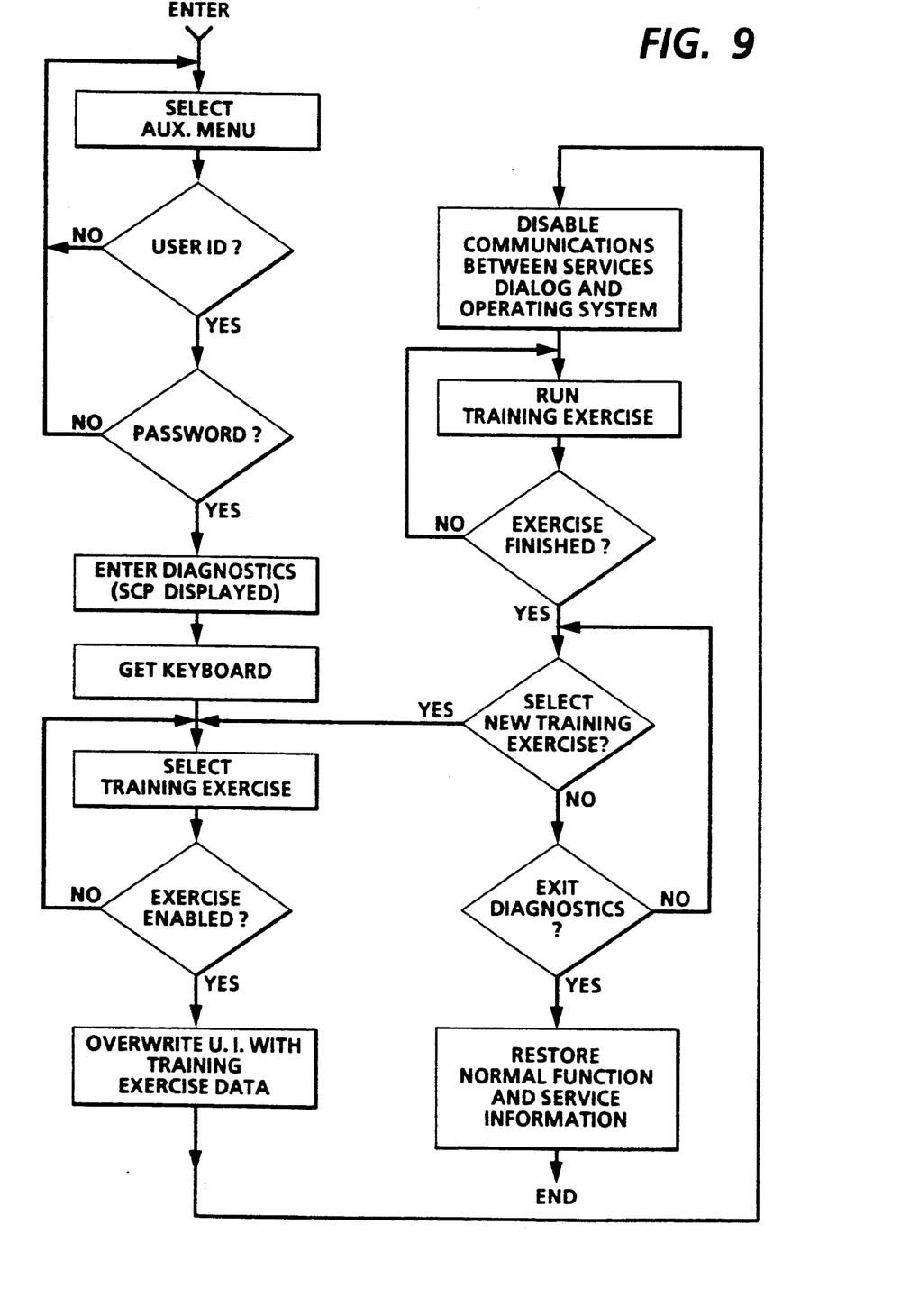
FIG. 9 is a flow chart illustrating the process for accessing the training system of the present invention.

In FIG. 8, an example of a training exercise, i.e., "Training Exercise #1" is shown. There, certain artificial machine data is displayed in windows 230, 232 representing a mock system situation for use as a training exercise.

Following completion of the training exercise selected, a new training exercise may be selected by using keyboard 240 to enter a new training program ID or the Diagnostic mode exited. Exiting diagnostics exits the training mode, updates system data accumulated while the training session was being run, and re-establishes access between the operating system and the service dialog.

During the training mode, displays may be updated by actuating an update display icon 250 on screen 62. Actuating icon 250 overrides the training session inhibition against updating system data to current levels.

While the invention has been described with reference to the structure disclosed, it is not confined to the details set forth, but is intended to cover such modifications or changes as may come within the scope of the following claims.

I claim:

1. A process for training technicians to service printing machines with a training program and a printing machine of the type having a user interface for programming the printing machine, the user interface including a screen for displaying system programming selections and operating data, and an operating system for operating the printing machine in response to instructions, the operating system including a service dialog cooperable with the user interface to facilitate identification and correction of machine faults and malfunctions, comprising the steps of:

providing a training program with the printing machine for access and use in training the technicians, the training program being interactive with a technician, as a result of one or more actions being taken by the technician with respect to the user interface screen, and simulating responses of the printing machine in a mock system situation;

selecting the training program;

overwriting any system programming selections displayed on the user interface screen with a programming display provided by the training program, said overwriting step including displaying simultaneously a plurality of sets of machine data respectively in a plurality of windows on the user interface screen;

interrupting access of the machine operating system to the service dialog;

executing the training program, with the displayed plurality of sets of machine data in the plurality of windows, so that the technician learns about selected responses of the printing machine in the mock system situation; and restoring the printing machine to an operating state, on completion of the training program, for enabling normal programming selections to be made and enabling the machine operating system to access the service dialog.

2. The process according to claim 1, in which the printing machine includes a machine memory, further comprising the step of storing the training program in the machine memory.

3. The process according to claim 1, in which the printing machine includes a memory disk, wherein said overwriting step includes retrieving the training program from the memory disk.

4. The process according to claim 1, in which operating data is displayed on the user interface screen during said overwriting step, further comprising the steps of:
  storing ongoing machine operating data while the training program is being performed;
  overwriting any system programming selections displayed on the user interface screen;
  terminating the training program; and
  updating the operating data displayed on the user interface screen with the stored operating data upon terminating the training program.

5. A process for enhancing training of technicians for servicing a printing machine of the type having a user interface with an interactive display screen for displaying program selections and operating information and data for use in programming and operating the printing machine, and an operating system for operating the printing machine in response to programming instructions inputted to the printing machine, the programming instructions including machine service instructions for servicing the printing machine, the machine service instructions including a machine service dialog for displaying servicing instructions and machine data, comprising the steps of:
  embedding a plurality of training programs permanently in the operating system for use in training technicians, each of the training programs being interactive with a technician as a result of selected actions being taken by the operator with respect to the interactive display screen;
  selecting one of the training programs embedded in the operating system;
  interrupting access between the operating system and the machine service dialog in response to said selecting step;
  overwriting any programming selections displayed on the user interface with program selections generated by the selected training program, said overwriting step including displaying simultaneously a plurality of sets of machine data respectively in a plurality of windows on the interactive display screen;
  executing the selected training program so that the printing machine is operated in accordance with the selected training program, said executing step including simulating predetermined machine operating conditions and faults, said simulating step being achieved as a result of the technician viewing the displayed plurality of sets of machine data and taking one of the selected actions with respect to the screen; and
  restoring the printing machine to a normal operating condition upon completion of said executing step.

6. The process according to claim 5, in which operating data is displayed on the interactive display screen prior to said interrupting step, further comprising the step of storing the displayed operating data during said operating step.

7. The process according to claim 5 including the step of controlling access to the training programs with a password.

* * * * *